US006179165B1

United States Patent
Knight et al.

(10) Patent No.: US 6,179,165 B1
(45) Date of Patent: Jan. 30, 2001

(54) PASTRY BAG CONSTRUCTION

(76) Inventors: David Knight; Joanne Knight, both of 1043 Whispering Oak Cir., Manahawkin, NJ (US) 08050

(*) Notice: Under 35 U.S.C. 154(b), the term of this patent shall be extended for 0 days.

(21) Appl. No.: 09/338,374

(22) Filed: Jun. 23, 1999

(51) Int. Cl.⁷ .................................................. B65D 35/00
(52) U.S. Cl. .................. 222/107; 222/92; 222/185.1; 222/466
(58) Field of Search .................. 222/92, 107, 185.1, 222/465.1, 466

(56) References Cited

U.S. PATENT DOCUMENTS

| 3,157,312 | 11/1964 | Kitterman | 222/1 |
|---|---|---|---|
| 3,200,996 | 8/1965 | Picatti | 222/107 |
| 4,205,765 | 6/1980 | May | 222/107 |
| 4,480,766 | * 11/1984 | Platt | 222/107 |
| 5,056,691 | * 10/1991 | Tolbert | 222/466 |
| 5,090,597 | 2/1992 | Johnson | 222/107 |
| 5,366,116 | 11/1994 | Burtis | 222/107 |
| 5,586,689 | * 12/1996 | D'Amato | 222/92 |
| 5,931,346 | * 8/1999 | Wallays | 222/107 |
| 5,954,238 | * 9/1999 | Rausch | 222/465.1 |

* cited by examiner

Primary Examiner—Joseph A. Kaufman
(74) Attorney, Agent, or Firm—Henderson & Sturm LLP

(57) ABSTRACT

A pastry bag construction 10 comprising a generally elongated pastry bag member 20 fabricated from a generally flexible material 21 and having an upper end provided with an enlarged opening 23 and a lower end provided with a relatively small outlet opening 22 wherein the exterior periphery of the bag member 20 is provided with a plurality of finger engaging loop units 12 which include an elongated horizontally disposed strap member 30 and a plurality of relatively short vertically disposed strap members 40 wherein the strap members 30 and 40 define loop openings 32 and 41 which are dimensioned to receive the fingers of the users hands for manipulating the bag member 20.

10 Claims, 1 Drawing Sheet

PASTRY BAG CONSTRUCTION

BACKGROUND OF THE INVENTION

1. Field of the Invention

The present invention relates to the field of pastry bag constructions in general and in particular to an improved pastry bag provided with external hand straps, finger loops to facilitate the manipulation of the pastry bag.

2. Description of Related Art

As can be seen by reference to the following U.S. Pat. Nos. 5,366,116; 5,090,597; 4,205,765; 3,200,996; and 3,157,312, the prior art is replete with myriad and diverse pastry bag constructions.

While all of the aforementioned prior art constructions are more than adequate for the basic purpose and function for which they have been specifically designed, they are uniformly deficient with respect to their failure to provide a simple, efficient, and practical pastry bag construction that is simple and easy to manipulate particularly when making intricate designs that require that the pastry bag opening be disposed at a variety of angles to produce the desired effect.

Unfortunately, none of the aforementioned prior art constructions provide any sort of auxiliary external gripping elements that will facilitate the user's grasp of the pastry bag.

As a consequence of the foregoing situation, there has existed a longstanding need for a new and improved pastry bag construction provided with a plurality of finger and hand engageable accessories that will improve the users' grip and control of the pastry bag; and, the provision of such a construction is the stated objective of the present invention.

BRIEF SUMMARY OF THE INVENTION

Briefly stated, the improved pastry bag construction that forms the basis of the present invention comprises in general a pastry bag unit and a plurality of gripping units provided on the exterior surface of the pastry bag unit to facilitate the users' grip and control of the pastry bag unit during normal usage.

As will be explained in greater detail further on in the specification, the pastry bag unit is of a generally conventional design and construction and includes a generally tapered flexible bag member having a nozzle element formed on the lower end and an enlarged opening formed on the upper end which is dimensioned to receive bulk quantities of generally thick flowable material.

In addition, the plurality of gripping units comprises a peripheral strap member and a plurality of finger loop members which are strategically positioned around the periphery of the bag member to facilitate the users' grasp and manipulation of the bag member as the contents of the bag member are dispensed in accordance with a desired pattern and quantity.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
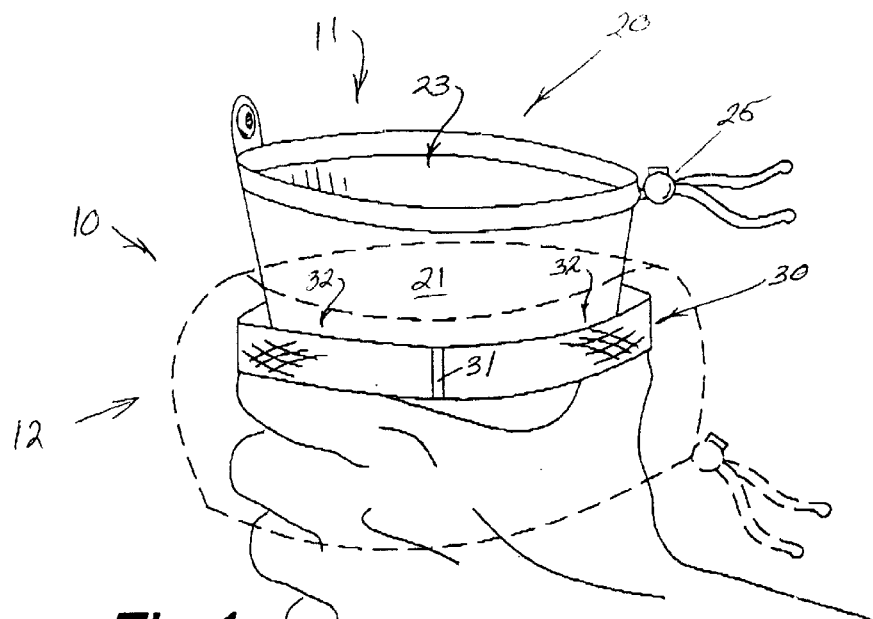
FIG. 1 is a perspective view showing the pastry bag construction in use.

As can be seen by reference to the drawings, and in particular to FIG. 1, the improved pastry bag construction that forms the basis of the present invention is designated generally by the reference number 10. The construction 10 comprises in general a pastry bag unit 11 and a plurality of gripping loop units 12. These units will now be described in seriatim fashion.

Figure 2:
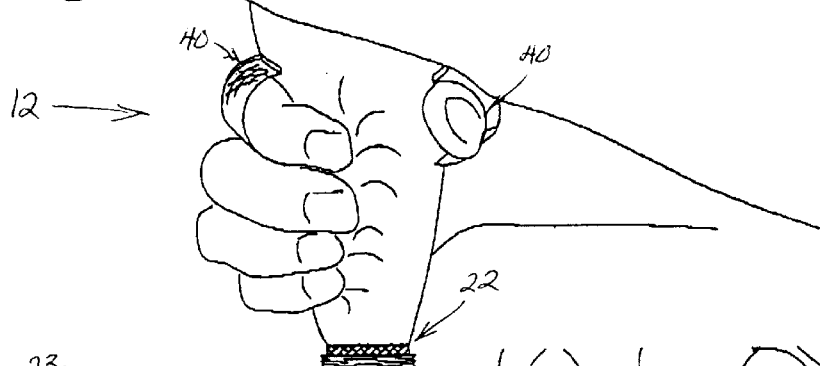
FIG. 2 is a side elevation view of the pastry bag construction.

As shown in FIGS. 1 and 2, the pastry bag unit 11 comprises in general a relatively conventional elongated tapered bag member 20 fabricated from generally flexible material 21; wherein, the lower end of the flexible receptacle member 20 is provided with a relatively small threaded dispensing outlet 22 and wherein the upper end of the receptacle member 20 is provided with an enlarged opening 23 dimensioned to receive a quantity of generally viscous flowing material such as pastry dough, icing or the like.

In addition, the upper end of the receptacle member 20 may also be provided with a closure element 25 for sealing the enlarged opening 23 once the interior of the receptacle member 20 has been filled with a desired quantity of the flowing material.

As can best be seen by reference to FIGS. 1 and 2, the plurality of gripping loop units 12 comprises an upper horizontally aligned peripheral strap member 30 which is attached at spaced locations 31 around the periphery of bag member 20 to form a plurality of loop openings 32 which are dimensioned to receive the fingers of one of the users' hands; and, a plurality of vertically aligned relatively short lower strap members 40 which define loop openings 41 at spaced locations around the lower portion of the bag member 20; wherein the loop openings are dimensioned to receive selected individual digits of the users' other hand.

By now, it should be appreciated that the provision of a plurality of looped gripping elements 30 and 40 on the exterior surface of the bag member 20 allows the user to obtain a firm grasp on the bag member 20 to facilitate the dispensing of the bag contents as well as to perform the various manipulations of the bag outlet 22 required to produce a desired result.

Figure 3:
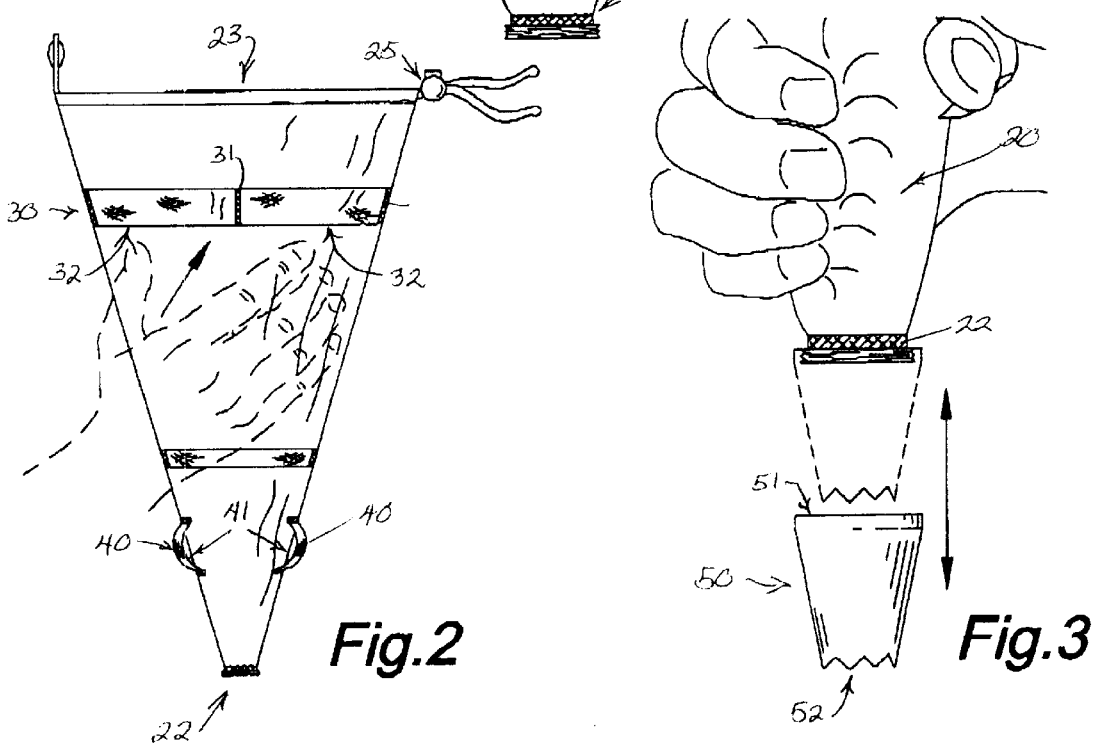
FIG. 3 is a detail view showing the engagement of an optional decorative nozzle accessory with the outlet end of the pastry bag construction.

Turning now to FIG. 3, it can be seen that the threaded outlet 22 of the bag member 20 is designed to be operably engaged with the threaded upper end 51 of a decorative nozzle accessory 50 wherein the lower end of the nozzle accessory 50 is provided with a contoured nozzle outlet 52 that can produce a decorative pattern with the contents of the bag member.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooded parts together, whereas, a screw employs a helical surface, in the environment of fastening wooden parts, a nail and a screw may be equivalent structures.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

We claim:

1. A pastry bag construction comprising:

a pastry bag unit including a generally flexible pastry bag member having an upper end provided with an enlarged opening and a lower end provided with a relatively small outlet opening; and, a plurality of loop units disposed on the exterior surface of the bag member to facilitate the users' grasp and manipulation of the bag members; wherein, the plurality of loop units includes an elongated strap member secured at spaced locations around the periphery of the bag member to create a plurality of loop openings.

2. The construction as in claim 1; wherein, the bag member has an elongated generally tapered configuration.

3. The construction as in claim 1; wherein, the plurality of loop units includes a plurality of generally short strap members affixed to the periphery of the bag member wherein each of the plurality of short strap members forms a loop opening dimensioned to receive one of the digits of a users' hand.

4. The construction as in claim 3; wherein, the plurality of relatively short strap members are vertically disposed on the lower portion of the bag member.

5. The construction as in claim 1; wherein, the elongated strap member is horizontally disposed on the upper portion of the bag member.

6. The construction as in claim 1; wherein, the plurality of loop units includes the elongated strap member secured at spaced locations around the periphery of the bag member and a plurality of relatively short strap members forming individual loop openings at spaced locations of the bag member.

7. A pastry bag construction comprising:

a pastry bag unit including a generally flexible pastry bag member having an upper end provided with an enlarged opening and a lower end provided with a relatively small outlet opening; and, a plurality of loop units disposed on the exterior surface of the bag member to facilitate the users' grasp and manipulation of the bag member; wherein, the plurality of loop units includes an elongated strap member secured at spaced locations around the periphery of the bag member and plurality of relatively short strap members forming individual loop openings a spaced locations on the bag member.

8. The construction as in claim 7; wherein, the bag member has an elongated generally tapered configuration.

9. The construction as in claim 7; wherein, the elongated strap member is horizontally disposed on the upper portion of the bag member.

10. The construction as in claim 7; wherein, the plurality of relatively short strap members are vertically disposed on the lower portion of the bag member.

* * * * *